(12) United States Patent
Ikeno et al.

(10) Patent No.: US 12,025,890 B2
(45) Date of Patent: Jul. 2, 2024

(54) LIQUID CRYSTAL DISPLAY DEVICE

(71) Applicant: Shanghai Tianma Micro-Electronics Co., Ltd., Shanghai (CN)

(72) Inventors: Hidenori Ikeno, Kanagawa (JP); Shinya Onda, Kanagawa (JP); Tomomi Honda, Kanagawa (JP); Takayuki Konno, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/163,920

(22) Filed: Feb. 3, 2023

(65) Prior Publication Data

US 2023/0251536 A1 Aug. 10, 2023

(30) Foreign Application Priority Data

Feb. 10, 2022 (JP) .................................. 2022-019875

(51) Int. Cl.
*G02F 1/1362* (2006.01)
*G02F 1/1368* (2006.01)

(52) U.S. Cl.
CPC .. *G02F 1/136209* (2013.01); *G02F 1/136222* (2021.01); *G02F 1/136286* (2013.01); *G02F 1/1368* (2013.01)

(58) Field of Classification Search
CPC .................................................... G02F 1/1362
See application file for complete search history.

(56) References Cited

U.S. PATENT DOCUMENTS

| | | | |
|---|---|---|---|
| 2007/0076425 A1* | 4/2007 | Mizuyoshi | G02B 6/0046 362/551 |
| 2007/0242028 A1 | 10/2007 | Kitagawa et al. | |
| 2009/0147186 A1* | 6/2009 | Nakai | G02F 1/13471 345/89 |

(Continued)

FOREIGN PATENT DOCUMENTS

| | | |
|---|---|---|
| JP | 2007-310376 A | 11/2007 |
| JP | 2011-076107 A | 4/2011 |

(Continued)

*Primary Examiner* — Sang V Nguyen
(74) *Attorney, Agent, or Firm* — Sughrue Mion, PLLC

(57) ABSTRACT

A liquid crystal display device includes a first liquid crystal display panel, and a second liquid crystal display panel that overlaps the first liquid crystal display panel. At least one of the first liquid crystal display panel and the second liquid crystal display panel includes a light blocking pattern that is repeatedly arranged and has light blocking properties. The light blocking pattern includes a first light blocking line and a second light blocking line that extend in a predetermined direction. The first light blocking line includes a first incline inclined with respect to the predetermined direction, and a second incline inclined in a direction opposite the first incline with respect to the predetermined direction, and the second light blocking line is adjacent to the first light blocking line and is line-symmetrical, with respect to the predetermined direction, to the first light blocking line. At least one of the first light blocking line and the second light blocking line is formed from one of scan wirings and signal wiring of the first liquid crystal display panel and the second liquid crystal display panel.

5 Claims, 10 Drawing Sheets

(56) References Cited

U.S. PATENT DOCUMENTS

| | | |
|---|---|---|
| 2020/0292894 A1 | 9/2020 | Liu et al. |
| 2021/0223647 A1* | 7/2021 | Wang ................ G02F 1/136209 |
| 2022/0102325 A1* | 3/2022 | Yu ........................... H01L 33/62 |
| 2022/0404662 A1* | 12/2022 | Shimoshikiryoh ......................... G02F 1/13471 |

FOREIGN PATENT DOCUMENTS

| | | |
|---|---|---|
| JP | 2016-133535 A | 7/2016 |
| JP | 2021-535415 A | 12/2021 |

* cited by examiner

LIQUID CRYSTAL DISPLAY DEVICE

CROSS-REFERENCE TO RELATED APPLICATION

This application claims the benefit of Japanese Patent Application No. 2022-019875, filed on Feb. 10, 2022, the entire disclosure of which is incorporated by reference herein.

FIELD

The present disclosure relates generally to a liquid crystal display device.

BACKGROUND

In the related art, liquid crystal display devices are known in which a plurality of liquid crystal panels are stacked to improve contrast. For example, Unexamined Japanese Patent Application Publication (Translation of PCT Application) No. 2021-535415 describes a display panel that includes a display liquid crystal panel and a light control panel that are stacked.

In Unexamined Japanese Patent Application Publication (Translation of PCT Application) No. 2021-535415, the display liquid crystal panel realizes a display function, and the light control panel controls the light that enters the display liquid crystal panel from a back light. The light control panel includes a plurality of signal lines (gate lines and data lines). At least a portion of the signal lines of the light control panel are polygonal lines.

In Unexamined Japanese Patent Application Publication (Translation of PCT Application) No. 2021-535415, by configuring the signal lines of the light control panel as polygonal lines, the signal lines of the light control panel and the grid lines (gate lines and data lines) of the display liquid crystal panel are formed in different patterns. As a result, the moiré of the display panel is reduced. However, since the polygonal lines of the light control panel have the same shape and are arranged at equal intervals, the moiré of the display panel cannot be sufficiently suppressed.

SUMMARY

A liquid crystal display device according to a first aspect of the present disclosure includes:
 a first liquid crystal display panel; and
 a second liquid crystal display panel that is positioned on a side, opposite a surface of an observer side, of the first liquid crystal display panel so as to overlap the first liquid crystal display panel, wherein
 at least one of the first liquid crystal display panel and the second liquid crystal display panel includes a light-blocking pattern that is repeatedly arranged and has light blocking properties,
 the light blocking pattern includes a first light blocking line that extends in a predetermined direction, the first light blocking line including a first incline inclined with respect to the predetermined direction and a second incline inclined in a direction opposite the first incline with respect to the predetermined direction, and a second light blocking line that is adjacent to the first light blocking line and that is line-symmetrical, with respect to the predetermined direction, to the first light blocking line, and
 at least one of the first light blocking line and the second light blocking line is formed from one of a scan wiring and a signal wiring of the first liquid crystal display panel and the second liquid crystal display panel.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a liquid crystal display device according to various embodiments is described while referencing the drawings.

A liquid crystal display device 10 according to the present embodiment is described while referencing FIGS. 1 to 10. The liquid crystal display device 10 displays a color image using a first liquid crystal display panel 100 and a second liquid crystal display panel 200, described later.

Figure 1:
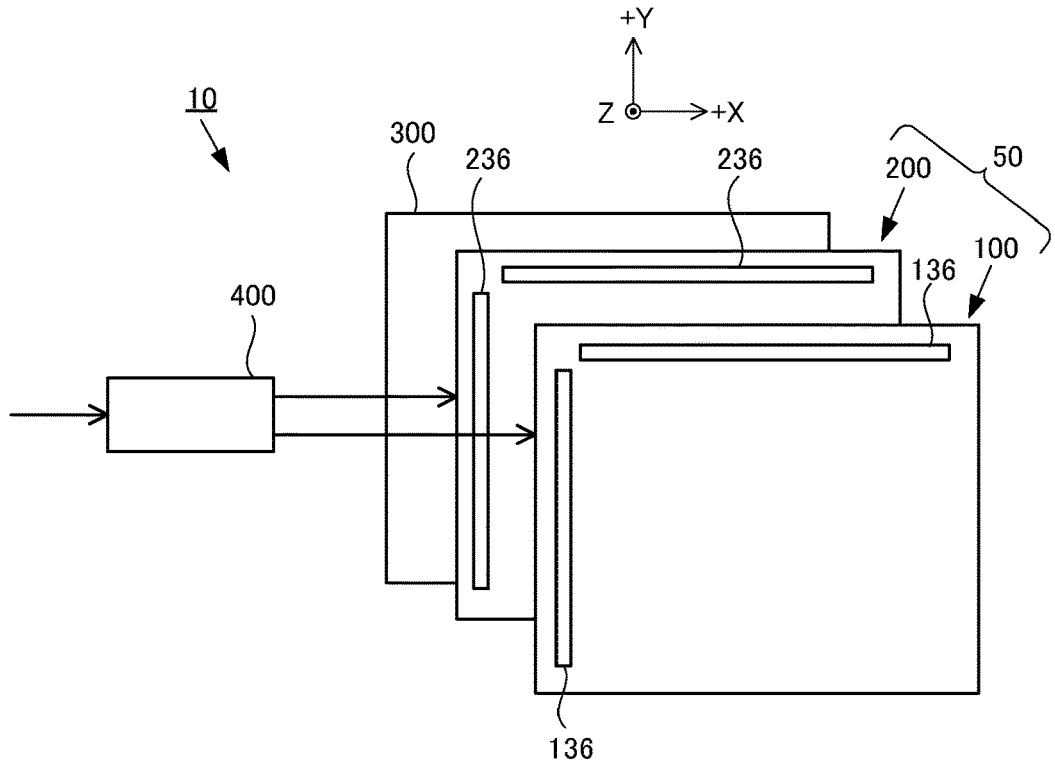
FIG. 1 is a schematic drawing illustrating a liquid crystal display device according to Embodiment 1.

As illustrated in FIG. 1, the liquid crystal display device 10 includes a panel section 50, a back light 300, and a display controller 400. The panel section 50 includes the first liquid crystal display panel 100 and the second liquid crystal display panel 200. The back light 300 is a light source that emits light on the first liquid crystal display panel 100 and the second liquid crystal display panel 200. The display controller 400 controls the displays of the first liquid crystal display panel 100 and the second liquid crystal display panel 200. Note that, in the present description, to facilitate comprehension, in the liquid crystal display device 10 of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction."

Panel Section

The panel section 50 includes the first liquid crystal display panel 100 and the second liquid crystal display panel 200. The first liquid crystal display panel 100 is positioned on an observer side (the +Z side) and displays a color image. The second liquid crystal display panel 200 is positioned on a side, opposite the surface of the observer side, of the first liquid crystal display panel 100 (a back surface side of the first liquid crystal display panel 100), and overlaps the first liquid crystal display panel 100. The second liquid crystal display panel 200 displays a monochrome image.

First Liquid Crystal Display Panel

In one example, the first liquid crystal display panel 100 is implemented as a known transmissive horizontal electric field type liquid crystal display panel. The first liquid crystal display panel 100 is active matrix driven by thin film transistors (TFT).

Figure 2:
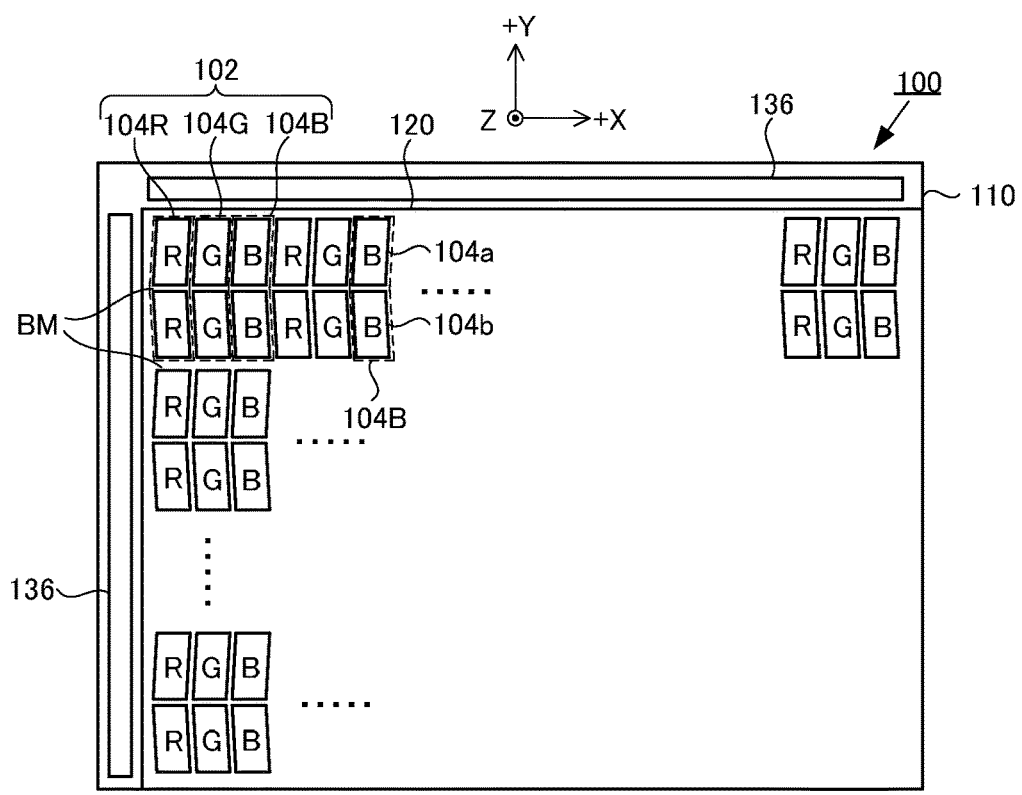
FIG. 2 is a plan view illustrating a first liquid crystal display panel according to Embodiment 1.

As illustrated in FIG. 2, the first liquid crystal display panel 100 includes main pixels 102 arranged in a matrix. The main pixels 102 include a red pixel 104R that emits red light, a green pixel 104G that emits green light, and a blue pixel 104B that emits blue light that are defined in a V-shape by a black matrix BM. Note that the red pixel 104R, the green pixel 104G, and the blue pixel 104B may be referred to collectively as "sub pixels 104."

The sub pixels 104 are divided into two domains 104a, 104b having a different rotation direction of a first liquid crystal 130. The domain 104a and the domain 104b are defined by the black matrix BM.

Figure 3:
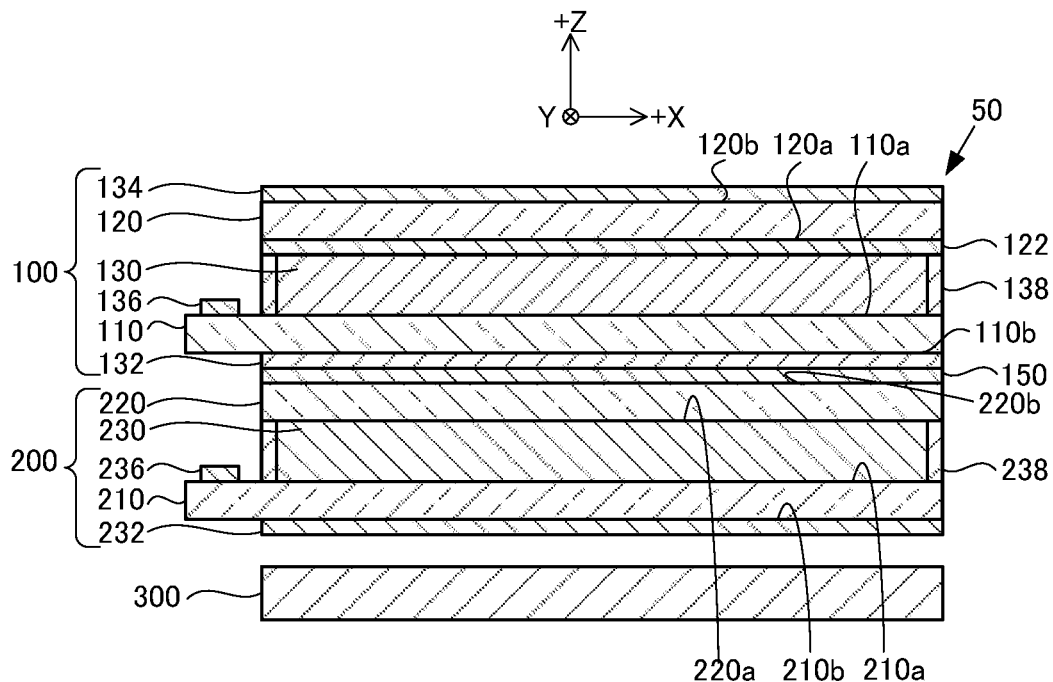
FIG. 3 is a cross-sectional view illustrating the liquid crystal display device according to Embodiment 1.

As illustrated in FIG. 3, the first liquid crystal display panel 100 includes a first TFT substrate 110, a first counter substrate 120, a first liquid crystal 130, a first polarizing plate 132, a second polarizing plate 134, and a first driver circuit 136. The first TFT substrate 110 and the first counter substrate 120 sandwich the first liquid crystal 130. The first polarizing plate 132 is provided on the first TFT substrate 110, and the second polarizing plate 134 is provided on the first counter substrate 120.

In one example, the first TFT substrate 110 is implemented as a glass substrate. TFTs for selecting the sub pixels 104, common electrodes, pixel electrodes, an alignment film for aligning the first liquid crystal 130, and the like (all not illustrated in the drawings) are provided on a main surface 110a on the first liquid crystal 130 side of the first TFT substrate 110.

Furthermore, a plurality of common wirings, a plurality of signal wirings, and a plurality of scan wirings (all not illustrated in the drawings) are formed on the main surface 110a of the first TFT substrate 110. The common wirings supply common potential to the common electrodes that apply voltage to the first liquid crystal 130. The signal wirings supply, via the TFTs, voltage to pixel electrodes that apply voltage to the first liquid crystal 130. The signal wirings extend in the Y direction and are bent along the V shape of the sub pixels 104. The scan wirings supply voltage for operating the TFTs. The scan wirings extend linearly in the Y direction. The sub pixels 104 are surrounded by the signal wirings and the scan wirings, and the TFTs are provided at intersections of the scan wirings and the signal wirings. The first polarizing plate 132 is provided on a main surface 110b of the first TFT substrate 110, on the side opposite the main surface 110a.

As illustrated in FIG. 3, the first counter substrate 120 opposes the first TFT substrate 110 and is adhered to the first TFT substrate 110 by a seal material 138. In one example, the first counter substrate 120 is implemented as a glass substrate. A color filter 122, the black matrix BM, an alignment film for aligning the first liquid crystal 130, and the like are provided on a main surface 120a on the first liquid crystal 130 side of the first counter substrate 120. In one example, the color filter 122 is implemented as a striped color filter in which color filters of the same color are disposed in the Y direction (color filter in which the stripe direction is the Y direction). A red color filter, a green color filter, and a blue color filter of the color filter 122 are each surrounded by the black matrix BM, and respectively correspond to the red pixel 104R, the green pixel 104G, and the blue pixel 104B. As illustrated in FIG. 2, the black matrix BM defines the main pixels 102, the sub pixels 104, and the domains 104a, 104b. The second polarizing plate 134 is provided on a main surface 120b of the first counter substrate 120, on the side opposite the main surface 120a. Note that, to facilitate comprehension, the black matrix BM, the alignment film, and the like are omitted from FIG. 3.

As illustrated in FIG. 3, the first liquid crystal 130 is sandwiched between the first TFT substrate 110 and the first counter substrate 120. In one example, the first liquid crystal 130 is implemented as a positive nematic liquid crystal. The first liquid crystal 130 is aligned, by the alignment film, in a direction parallel to the main surface 110a of the first TFT substrate 110. Additionally, the first liquid crystal 130 rotates in a plane parallel to the main surface 110a of the first TFT substrate 110 due to voltage being applied.

The first polarizing plate 132 is provided on the main surface 110b of the first TFT substrate 110. The second polarizing plate 134 is provided in the main surface 120b of the first counter substrate 120. One of the transmittance axis of the first polarizing plate 132 and the transmittance axis of the second polarizing plate 134 is arranged parallel to an alignment direction of the first liquid crystal 130. The transmittance axis of the first polarizing plate 132 and the transmittance axis of the second polarizing plate 134 are orthogonal to each other. The first polarizing plate 132 is adhered, by a light-transmitting adhesive layer 150, to a hereinafter described second counter substrate 220 of the second liquid crystal display panel 200. In one example, the adhesive layer 150 is implemented as an optical clear adhesive (OCA).

The first driver circuit 136 is provided on the main surface 110a of the first TFT substrate 110. The first driver circuit 136 supplies, on the basis of a color image signal supplied from the display controller 400, voltage to the scan wirings, the signal wirings, and the common wirings.

Second Liquid Crystal Display Panel

As illustrated in FIG. 3, the second liquid crystal display panel 200 is positioned on a back surface side (−Z side) of the first liquid crystal display panel 100 and is adhered to the first liquid crystal display panel 100 by the adhesive layer 150. The second liquid crystal display panel 200 displays a monochrome image.

Figure 4:
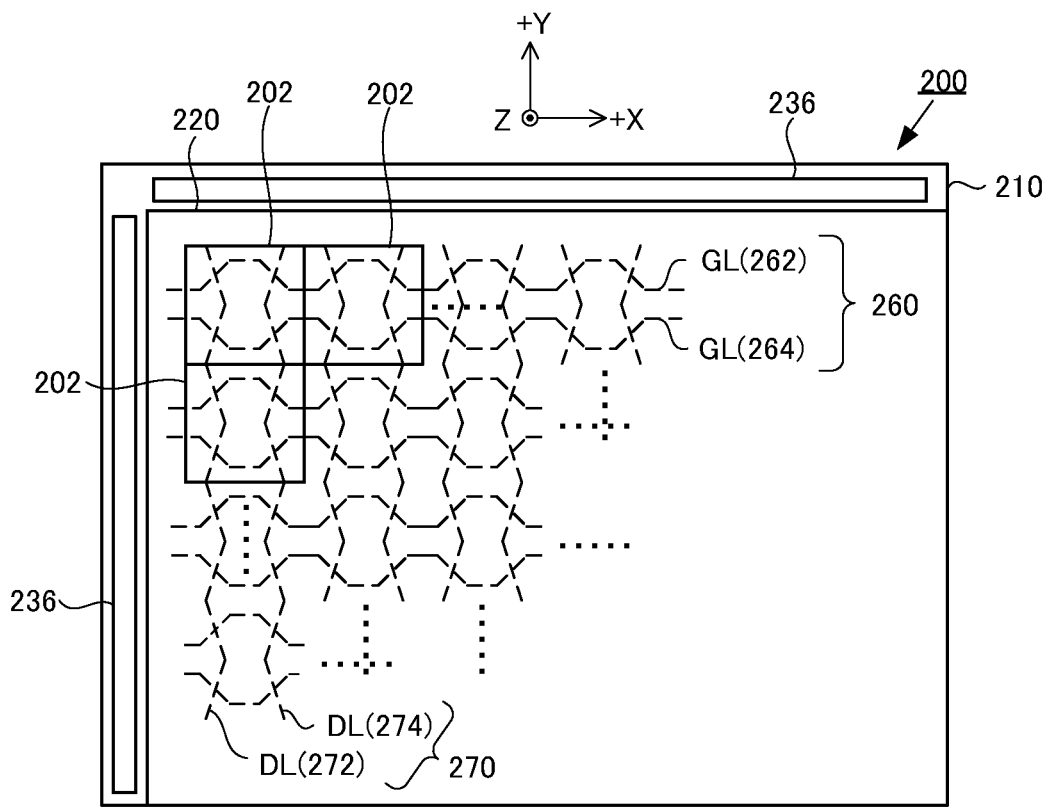
FIG. 4 is a plan view illustrating a second liquid crystal display panel according to Embodiment 1.

In the present embodiment, the second liquid crystal display panel 200 is implemented as a transmissive horizontal electric field type liquid crystal display panel that uses positive liquid crystal. The second liquid crystal display panel 200 is active matrix driven by hereinafter described switching elements 240. As illustrated in FIG. 4, the second liquid crystal display panel 200 includes main pixels 202 arranged in a matrix. In the present embodiment, one main pixel 202 of the second liquid crystal display panel 200 corresponds to 16 (4×4) main pixels 102 of the first liquid crystal display panel 100, and one main pixel 202 of the second liquid crystal display panel 200 emits light on 16 main pixels 102 of the first liquid crystal display panel 100. Note that, in FIG. 4, the scan wirings GL and the signal wirings DL are illustrated as broken lines. In the following drawings, the scan wirings GL and the signal wirings DL may be illustrated as broken lines or solid lines.

As illustrated in FIG. 3, the second liquid crystal display panel 200 includes a second TFT substrate 210, a second counter substrate 220, a second liquid crystal 230, a third polarizing plate 232, and a second driver circuit 236. The second TFT substrate 210 and the second counter substrate 220 sandwich the second liquid crystal 230. The third polarizing plate 232 is provided on the second TFT substrate 210. Note that, in the present embodiment, the first polarizing plate 132 of the first liquid crystal display panel 100 also serves as a polarizing plate on the light emission side of the second liquid crystal display panel 200. Additionally, note that the second liquid crystal display panel 200 is not provided with a color filter and a black matrix.

In one example, the second TFT substrate 210 is implemented as a glass substrate. A plurality of scan wirings GL; a plurality of signal wirings DL; common wirings (not illustrated), switching elements 240, pixel electrodes 250, and common electrodes CE of the main pixels 202; an alignment film (not illustrated) for aligning the second liquid crystal 230; and the like (all described later) are formed on a main surface 210a of the second liquid crystal 230 side of the second TFT substrate 210. The common wirings supply common potential to the common electrodes CE that apply voltage to the second liquid crystal 230. The signal wirings DL supply voltage to the pixel electrodes 250 via the switching elements 240. The pixel electrodes 250 apply voltage to the second liquid crystal 230. The scan wirings GL supply voltage for causing the switching elements 240 to operate. The third polarizing plate 232 is provided on a main surface 210b of the second TFT substrate 210, on the side opposite the main surface 210a.

In the present embodiment, the scan wirings GL form a hereinafter described first light blocking pattern 260, and the signal wirings DL form a second light blocking pattern 270. Configurations of the scan wirings GL, the signal wirings DL, the main pixels 202 (the switching elements 240, the common electrodes CE, and the pixel electrodes 250), and the like are described later.

The second counter substrate 220 opposes the second TFT substrate 210 and is adhered to the second TFT substrate 210 by a seal material 238. In one example, the second counter substrate 220 is implemented as a glass substrate. An alignment film (not illustrated) for aligning the second liquid crystal 230 is provided on a main surface 220a on the second liquid crystal 230 side of the second counter substrate 220. The adhesive layer 150 is provided on a main surface 220b of the second counter substrate 220, on the side opposite the main surface 220a. The second counter substrate 220 is adhered to the first liquid crystal display panel 100 (the first polarizing plate 132) via the adhesive layer 150.

The second liquid crystal 230 is sandwiched between the second TFT substrate 210 and the second counter substrate 220. The second liquid crystal 230 is implemented as a positive nematic liquid crystal. The second liquid crystal 230 is initially aligned in the Y direction by the alignment film. The second liquid crystal 230 rotates in a plane parallel to the main surface 210a of the second TFT substrate 210 due to voltage being applied.

The third polarizing plate 232 is provided on the main surface 210b of the second TFT substrate 210. The transmittance axis of the third polarizing plate 232 is arranged parallel to the alignment direction of the second liquid crystal 230. Note that the transmittance axis of the third polarizing plate 232 and the transmittance axis of the first polarizing plate 132 (polarizing plate on the light emission side of the second liquid crystal display panel 200) of the first liquid crystal display panel 100 are orthogonal to each other, and the second liquid crystal display panel 200 operates in a normally black mode.

The second driver circuit 236 is provided on the main surface 210a of the second TFT substrate 210. The second driver circuit 236 supplies, on the basis of a signal supplied from the display controller 400, voltage to the scan wirings GL, the signal wirings DL, and the common wirings.

Next, the scan wirings GL, the signal wirings DL, the first light blocking pattern 260, and the second light blocking pattern 270 are described while referencing FIGS. 4 to 7.

Figure 5:
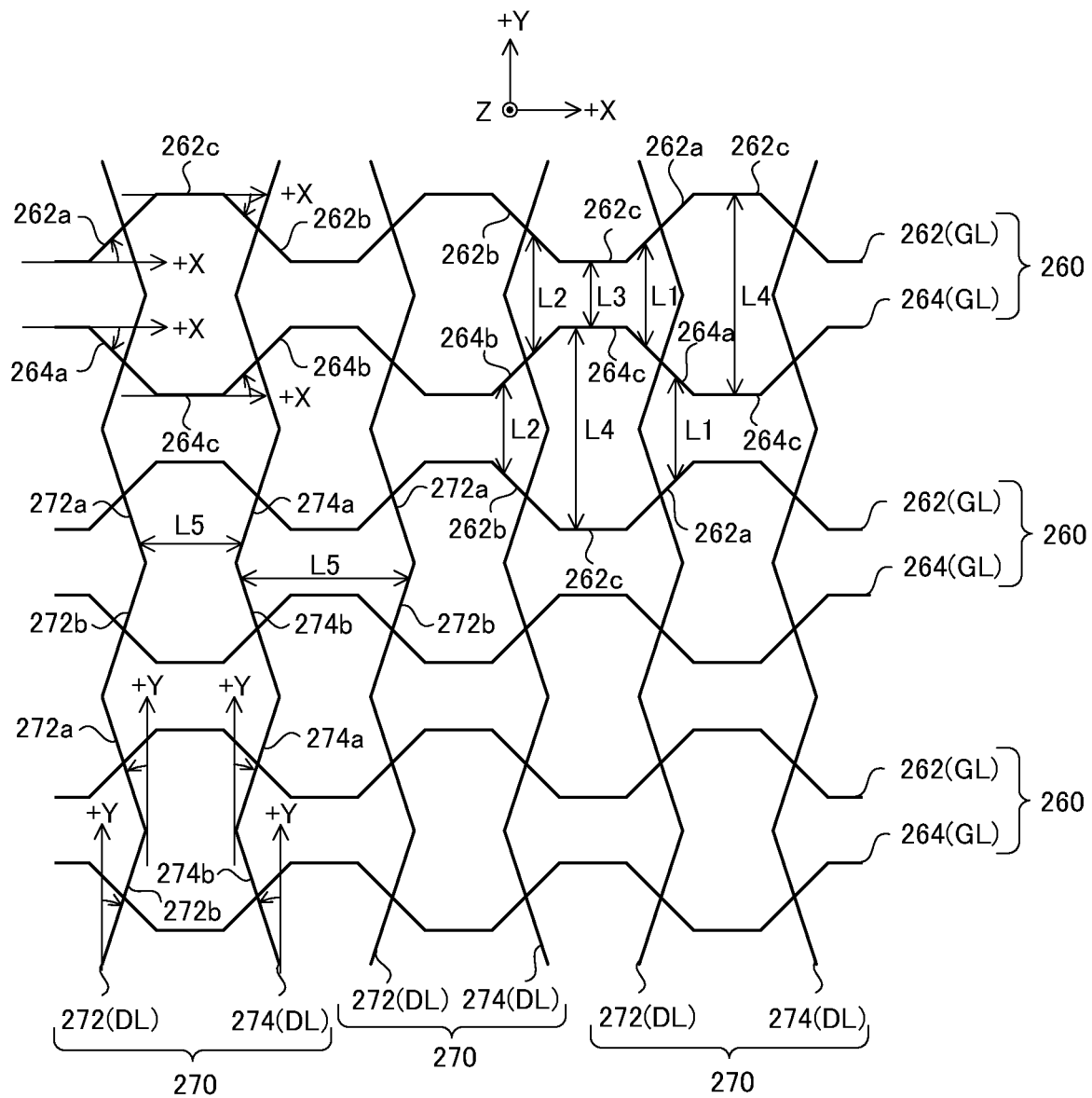
FIG. 5 is a schematic drawing illustrating a first light blocking pattern and a second light blocking pattern according to Embodiment 1.

Firstly, the scan wirings GL and the first light blocking pattern 260 are described. The scan wirings GL have light blocking properties. The scan wirings GL are formed from a metal (aluminum (Al), molybdenum (Mo), or the like). As illustrated in FIGS. 4 and 5, the scan wirings GL extend in the X direction and are arranged in the Y direction. Additionally, a pair of the scan wirings GL that are adjacent to each other form the first light blocking pattern 260 that extends in the X direction and has light blocking properties. The first light blocking pattern 260 is repeatedly arranged in the Y direction. Here, the term "light blocking properties" means blocking at least a portion of the light emitted from the back light 300. In the present embodiment, the X direction corresponds to a predetermined direction of the first light blocking pattern 260 (the scan wirings GL).

As illustrated in FIG. 5, one of the scan wirings GL (hereinafter also referred to as "first light blocking line 262") of the pair of scan wirings GL that are adjacent to each other includes a first incline 262a, a second incline 262b, and a first flat section 262c. The first incline 262a is inclined, at an acute angle, in a counterclockwise direction with respect to the +X direction. The second incline 262b is inclined, at an acute angle, in a direction opposite the first incline 262a (clockwise direction) with respect to the +X direction. The first flat section 262c extends parallel to the X direction, and connects the first incline 262a and the second incline 262b to each other.

The other scan wiring GL (hereinafter also referred to as "second light blocking line 264") of the pair of scan wirings GL that are adjacent to each other has line-symmetry, with respect to the X direction, with the one scan wiring GL (the first light blocking line 262), and includes a third incline 264a, a fourth incline 264b, and a second flat section 264c. The third incline 264a opposes the first incline 262a of the first light blocking line 262, and is inclined, at an acute angle, in the clockwise direction with respect to the +X direction. The fourth incline 264b opposes the second incline 262b of the first light blocking line 262, and is inclined, at an acute angle, in a direction opposite the third incline 264a (the counterclockwise direction) with respect to the +X direction. The second flat section 264c extends parallel to the X direction, opposes the first flat section 262c, and connects the third incline 264a and the fourth incline 264b to each other.

In the present embodiment, the first light blocking line 262 includes the first incline 262a that is inclined, at an acute angle, in the counterclockwise direction with respect to the +X direction, and the second incline 262b that is inclined, at an acute angle, in the direction opposite the first incline 262a with respect to the +X direction, and the first light blocking line 262 and the second light blocking line 264 adjacent to the first light blocking line 262 have a line-symmetrical relationship with respect to the X direction. Accordingly, as illustrated in FIG. 5, a spacing (spacing L1) between the first light blocking line 262 and the second light blocking line 264 continuously changes between the first incline 262a of the first light blocking line 262 and the third incline 264a of the second light blocking line 264. Additionally a spacing (spacing L2) between the first light blocking line 262 and the second light blocking line 264 also continuously changes between the second incline 262b of the first light blocking line 262 and the fourth incline 264b of the second light blocking line 264. Furthermore, spacings (spacing L3 and spacing L4) between the first flat section 262c of the first light blocking line 262 and the second flat section 264c of the second light blocking line 264 also change (spacing L3 and spacing L4 are alternately arranged along Y direction). As a result, even if the second liquid crystal display panel 200 and the first liquid crystal display panel 100 overlap, spatial frequency interference in the second liquid crystal display panel 200 and the first liquid crystal display panel 100 is suppressed and, as such, the moiré of the liquid crystal display device 10 can be suppressed.

Next, the signal wirings DL and the second light blocking pattern 270 are described. As with the scan wirings GL, the signal wirings DL have light blocking properties. The signal wirings DL are formed from a metal (aluminum (Al), molybdenum (Mo), or the like). As illustrated in FIGS. 4 and 5, the signal wirings DL extend in the Y direction and are arranged in the X direction. Additionally, a pair of the signal wirings DL that are adjacent to each other form the second light blocking pattern 270 that extends in the Y direction and has light blocking properties. In the present embodiment, the Y direction corresponds to a predetermined direction of the second light blocking pattern 270 (the signal wirings DL).

As illustrated in FIG. 5, one of the signal wirings DL (hereinafter also referred to as "third light blocking line 272") of the pair of signal wirings DL that are adjacent to each other includes a fifth incline 272a and a sixth incline 272b. The fifth incline 272a is inclined, at an acute angle, in the counterclockwise direction with respect to the +Y direction. The sixth incline 272b is inclined, at an acute angle, in the direction opposite the fifth incline 272a (clockwise direction) with respect to the +Y direction.

The other signal wiring DL (hereinafter also referred to as "fourth light blocking line 274") of the pair of signal wirings DL that are adjacent to each other has line-symmetry, with respect to the Y direction, with the one signal wiring DL (the third light blocking line 272), and includes a seventh incline 274a and an eighth incline 274b. The seventh incline 274a opposes the fifth incline 272a of the third light blocking line 272, and is inclined, at an acute angle, in the clockwise direction with respect to the +Y direction. The eighth incline 274b opposes the sixth incline 272b of the third light blocking line 272, and is inclined, at an acute angle, in the direction opposite the seventh incline 274a (the counterclockwise direction) with respect to the +Y direction. Note that the third light blocking line 272 and the fourth light blocking line 274 of the second light blocking pattern 270 respectively correspond to a first light blocking line and a second light blocking line of a light blocking pattern, and the fifth incline 272a and the sixth incline 272b of the third light blocking line 272 respectively correspond to a first incline and a second incline of the first light blocking line.

In the present embodiment, the third light blocking line 272 includes the fifth incline 272a that is inclined, at an acute angle, in the counterclockwise direction with respect to the +Y direction, and the sixth incline 272b that is inclined, at an acute angle, in the direction opposite the fifth incline 272a with respect to the +Y direction, and the third light blocking line 272 and the fourth light blocking line 274 adjacent to the third light blocking line 272 have a line-symmetrical relationship with respect to the Y direction. Accordingly, as illustrated in FIG. 5, a spacing L5 between the third light blocking line 272 and the fourth light blocking line 274 continuously changes. As a result, even if the second liquid crystal display panel 200 and the first liquid crystal display panel 100 overlap, spatial frequency interference in the second liquid crystal display panel 200 and the first liquid crystal display panel 100 is suppressed and, as such, the moiré of the liquid crystal display device 10 can be suppressed.

Figure 6:
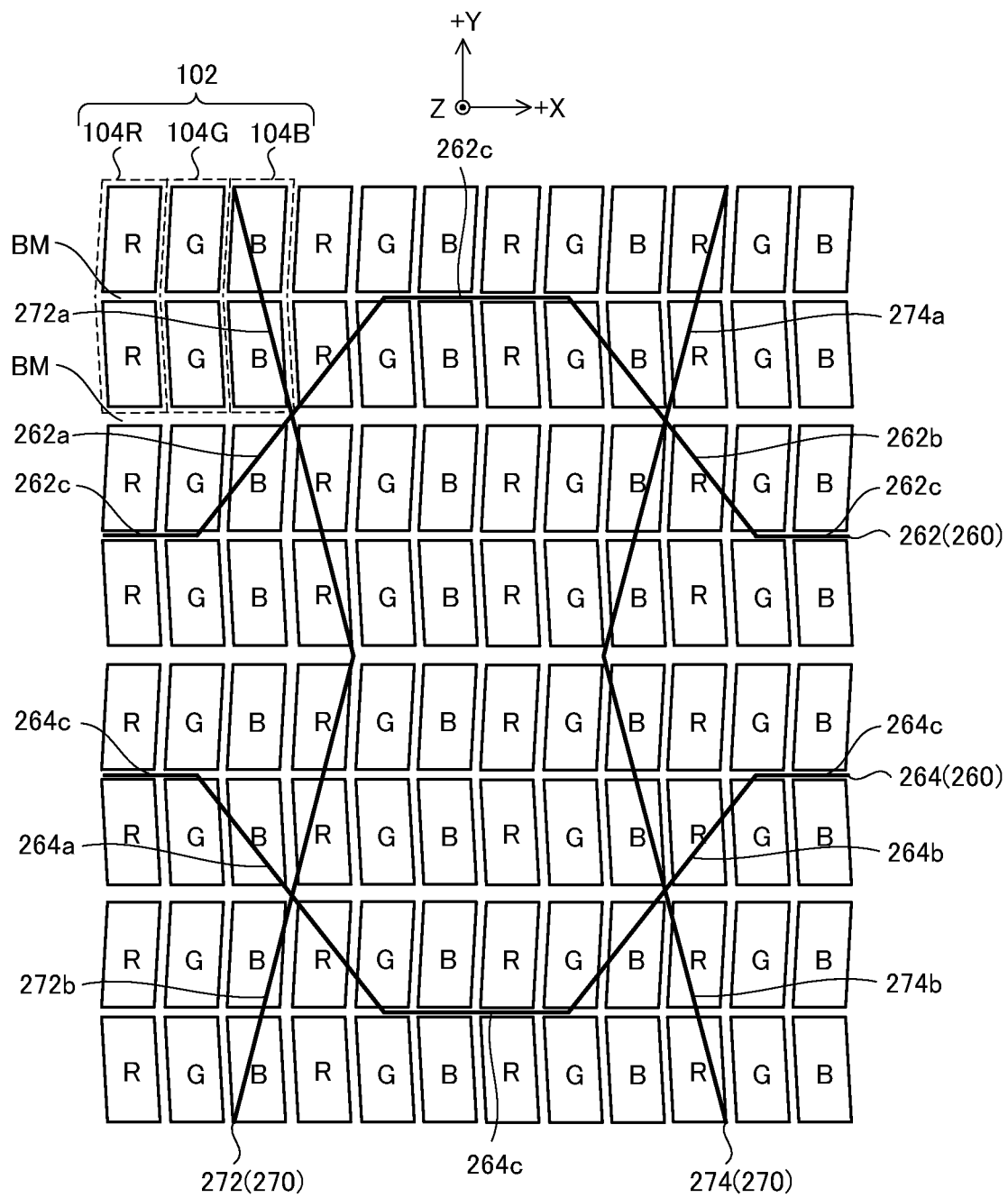
FIG. 6 is a schematic drawing illustrating the first light blocking pattern, the second light blocking pattern, and main pixels of the first liquid crystal display panel corresponding to one main pixel of the second liquid crystal display panel according to Embodiment 1.

Next, the overlapping of the first light blocking pattern 260 and the second light blocking pattern 270 with the main pixels 102 of the first liquid crystal display panel 100 is described while referencing FIG. 6. FIG. 6 illustrates the first light blocking pattern 260 (the scan wirings GL), the second light blocking pattern 270 (the signal wirings DL), and the main pixels 102 of the first liquid crystal display panel 100 corresponding to one main pixel 202 of the second liquid crystal display panel 200. In the present embodiment, as described later, one main pixel 102 of the first liquid crystal display panel 100 is driven by voltage (a signal) from a pair of adjacent scan wirings GL and a pair of adjacent signal wirings DL.

As illustrated in FIG. 6, in the first light blocking pattern 260 extending in the X direction, the first incline 262a and the second incline 262b of the first light blocking line 262 and the third incline 264a and the fourth incline 264b of the second light blocking line 264 are inclined across the plurality of sub pixels 104 (104R, 104G, 104B) of different colors of the first liquid crystal display panel 100. As a result, the brightness of the sub pixels 104 that the first light blocking pattern 260 overlaps slightly decreases, and the main pixel 102 including the sub pixels 104 that the first light blocking pattern 260 overlaps presents a color that differs slightly from the color to be displayed. However, since the sub pixels 104 in which a similar degree of reduction in brightness occurs are positioned in close proximity, the brightness of the sub pixels 104 is averaged with respect to the observer observing the liquid crystal display device 10, and the observer recognizes the brightnesses of the plurality of sub pixels 104 having the reduced brightness as the same brightness gradation. Accordingly, in terms of the entire display of the liquid crystal display device 10, it is possible to suppress recognition of color moiré by the observer. Note that, the first flat section 262c of the first light blocking line 262 and the second flat section 264c of the second light blocking line 264 overlap the black matrix BM of the first liquid crystal display panel 100.

In the second light blocking pattern 270 extending in the Y direction, the fifth incline 272a and the sixth incline 272b of the third light blocking line 272 and the seventh incline 274a and the eighth incline 274b of the fourth light blocking line 274 are inclined across the plurality of sub pixels 104 (104R, 104B) of different colors of the first liquid crystal display panel 100. As a result, as with the first light blocking pattern 260, the main pixel 102 including the sub pixels 104 that the second light blocking pattern 270 overlaps presents a color that differs slightly from the color to be displayed. However, the color presented by the main pixel 102 including the sub pixels 104 that the second light blocking pattern 270 overlaps and the color presented by the main pixel 102 positioned in the proximity of the main pixel 102 having the sub pixels 104 that the second light blocking pattern 270 overlaps are recognized by the observer as different colors and the saturation of the combined colors decreases. As a result, in terms of the entire display of the liquid crystal display device 10, it is possible to suppress recognition of color moiré by the observer.

Figure 7:
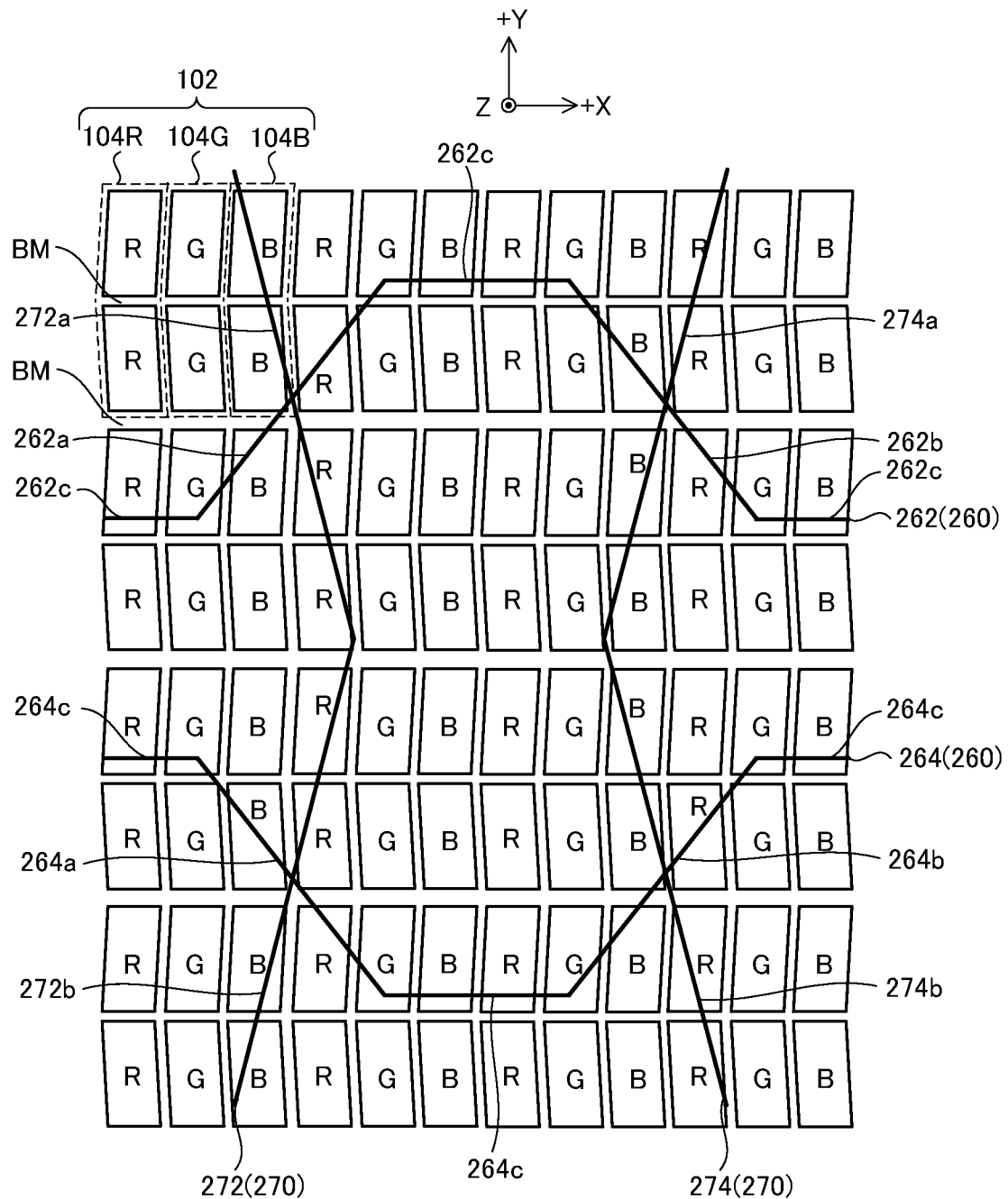
FIG. 7 is a schematic drawing illustrating the relationship between the first light blocking pattern and the second light blocking pattern, and the main pixels of the first liquid crystal display panel for a case in which superposing of the first liquid crystal display panel and the second liquid crystal display panel is offset, according to Embodiment 1.

Furthermore, even in a case in which, as illustrated in FIG. 7, the superposing of the second liquid crystal display panel 200 and the first liquid crystal display panel 100 is offset, the area of the first light blocking pattern 260 and the second light blocking pattern 270 overlapping the sub pixels 104 of the first liquid crystal display panel 100 does not significantly change compared to when the second liquid crystal display panel 200 and the first liquid crystal display panel 100 are accurately superposed. Additionally, even in a case in which the superposing of the second liquid crystal display panel 200 and the first liquid crystal display panel 100 is offset, the first incline 262a to the eighth incline 274b cross the sub pixels 104 of different colors. As a result, the color presented by the main pixel 102 is averaged across the adjacent main pixels 102 and, as such, even in a case in which the superposing of the second liquid crystal display panel 200 and the first liquid crystal display panel 100 is offset, it is possible to suppress recognition of color moiré by the observer.

Figure 8:
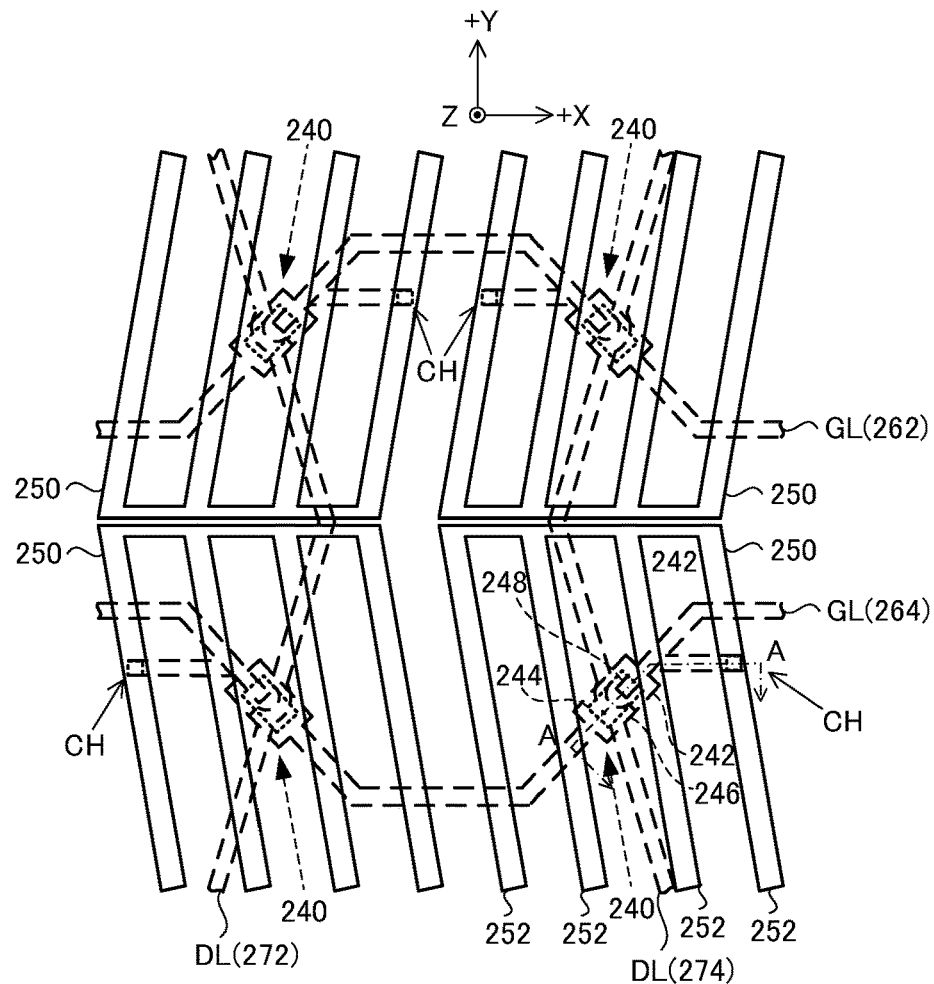
FIG. 8 is a plan view illustrating scan wirings, a signal wirings, switching elements, and the like of the second liquid crystal display panel according to Embodiment 1.
Figure 9:
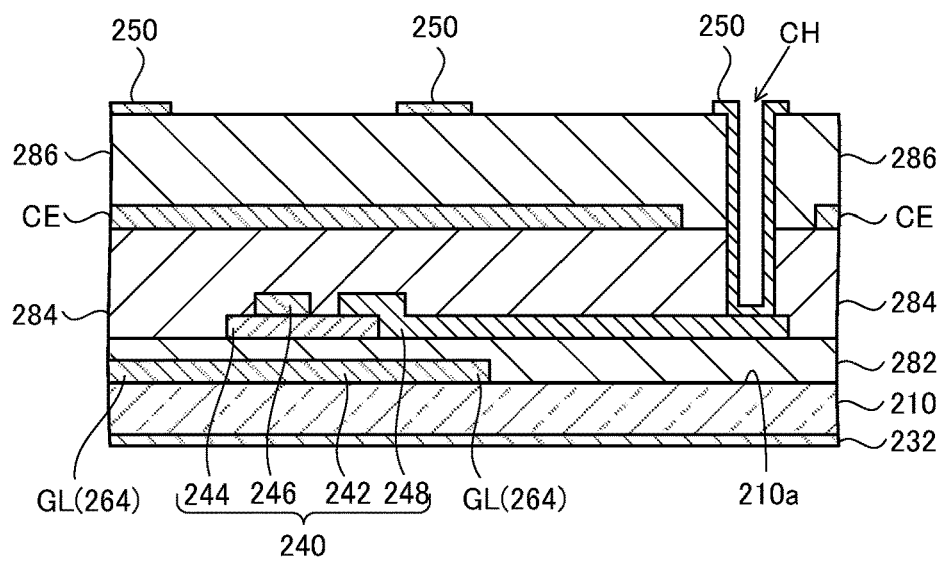
FIG. 9 is a cross-sectional view of one of the switching elements and a contact hole illustrated in FIG. 8, taken along line A-A.

Next, the scan wirings GL (the first light blocking line 262 and the second light blocking line 264); the signal wirings DL (the third light blocking line 272 and the fourth light blocking line 274); and the switching elements 240, the pixel electrodes 250, and the common electrodes CE of the main pixel 202 are described while referencing FIGS. 8 and 9. FIG. 8 is a plan view illustrating the scan wirings GL, the signal wirings DL, the switching elements 240, and the like. FIG. 9 is a cross-sectional view of one of the switching elements 240 and a contact hole CH illustrated in FIG. 8, taken along line A-A. Note that, to facilitate comprehension, the common electrodes CE are omitted from FIG. 8.

In the present embodiment, one main pixel 202 includes four switching elements 240 and four pixel electrodes 250. One main pixel 202 is driven by voltage (signals) from the pair of adjacent scan wirings GL (the first light blocking line 262 and the second light blocking line 264) and the pair of adjacent signal wirings DL (the third light blocking line 272 and the fourth light blocking line 274).

As illustrated in FIG. 9, the scan wirings GL (the first light blocking line 262 and the second light blocking line 264) are formed on the main surface 210a of the second TFT substrate 210, and are covered by a first insulating layer 282. The signal wirings DL (the third light blocking line 272 and the fourth light blocking line 274) are formed on the first insulating layer 282, and are covered by a second insulating layer 284.

As illustrated in FIG. 9, the common electrodes CE are formed on the second insulating layer 284. In one example, the common electrodes CE are formed from indium tin oxide (ITO). The common electrodes CE are covered by a third insulating layer 286.

The four switching elements 240 are respectively provided at intersections of the scan wirings GL and the signal wirings DL. As illustrated in FIGS. 8 and 9, each of the switching elements 240 includes a gate electrode 242, a semiconductor layer 244, a source electrode 246, and a drain electrode 248. In one example, the switching elements 240 are implemented as TFT elements.

The gate electrode 242 is formed, integrally with the scan wiring GL, on the main surface 210a of the second TFT substrate 210. As with the scan wirings GL, the gate electrode 242 is covered by the first insulating layer 282. The semiconductor layer 244 is provided, via the first insulating layer 282, in an island manner on the gate electrode 242. In one example, the semiconductor layer 244 is formed from amorphous silicon. The source electrode 246 is formed integrally with the signal wiring DL. The drain electrode 248 extends along the scan wiring GL from on the semiconductor layer 244 and, then, bends and connects to the pixel electrode 250. As illustrated in FIG. 9, the drain electrode 248 is connected to the pixel electrode 250 via the contact hole CH that penetrates the third insulating layer 286 and the second insulating layer 284. The gate electrode 242, the source electrode 246, and the drain electrode 248 are formed from a metal such as aluminum (Al), molybdenum (Mo), or the like. Additionally, as illustrated in FIG. 9, the semiconductor layer 244, the source electrode 246, and the drain electrode 248 are covered by the second insulating layer 284.

As illustrated in FIG. 9, the first insulating layer 282 covers the scan wirings GL, and the gate electrode 242 of the switching element 240. The second insulating layer 284 covers the semiconductor layer 244, the source electrode 246, and the drain electrode 248 of the switching element 240, and the first insulating layer 282. The third insulating layer 286 covers the common electrodes CE and the second insulating layer 284. The first insulating layer 282, the second insulating layer 284, and the third insulating layer 286 are formed from silicon nitride (SiNx), silicon oxide (SiOx), or the like.

As illustrated in FIG. 8, the four pixel electrodes 250 are respectively connected to the four switching elements 240 (the drain electrodes 248). The pixel electrodes 250 have a comb-tooth shape, and teeth 252 are inclined with respect to the Y direction. As illustrated in FIG. 9, the pixel electrodes 250 are formed on the third insulating layer 286. In one example, the pixel electrodes 250 are formed from ITO. Note that the angle at which the teeth 252 of the pixel electrodes 250 are inclined with respect to the Y direction, and the angle at which the signal wirings DL (the third light blocking line 272 and the fourth light blocking line 274) are inclined with respect to the Y direction are unrelated.

Back Light

As illustrated in FIG. 1, the back light 300 is arranged on the back side surface (the −Z side) of the second liquid crystal display panel 200. In one example, the back light 300 is implemented as a direct back light. The back light 300 includes a white light emitting diode (LED), a reflective sheet, a diffusion sheet, and the like (all not illustrated in the drawings).

Display Controller

Figure 10:
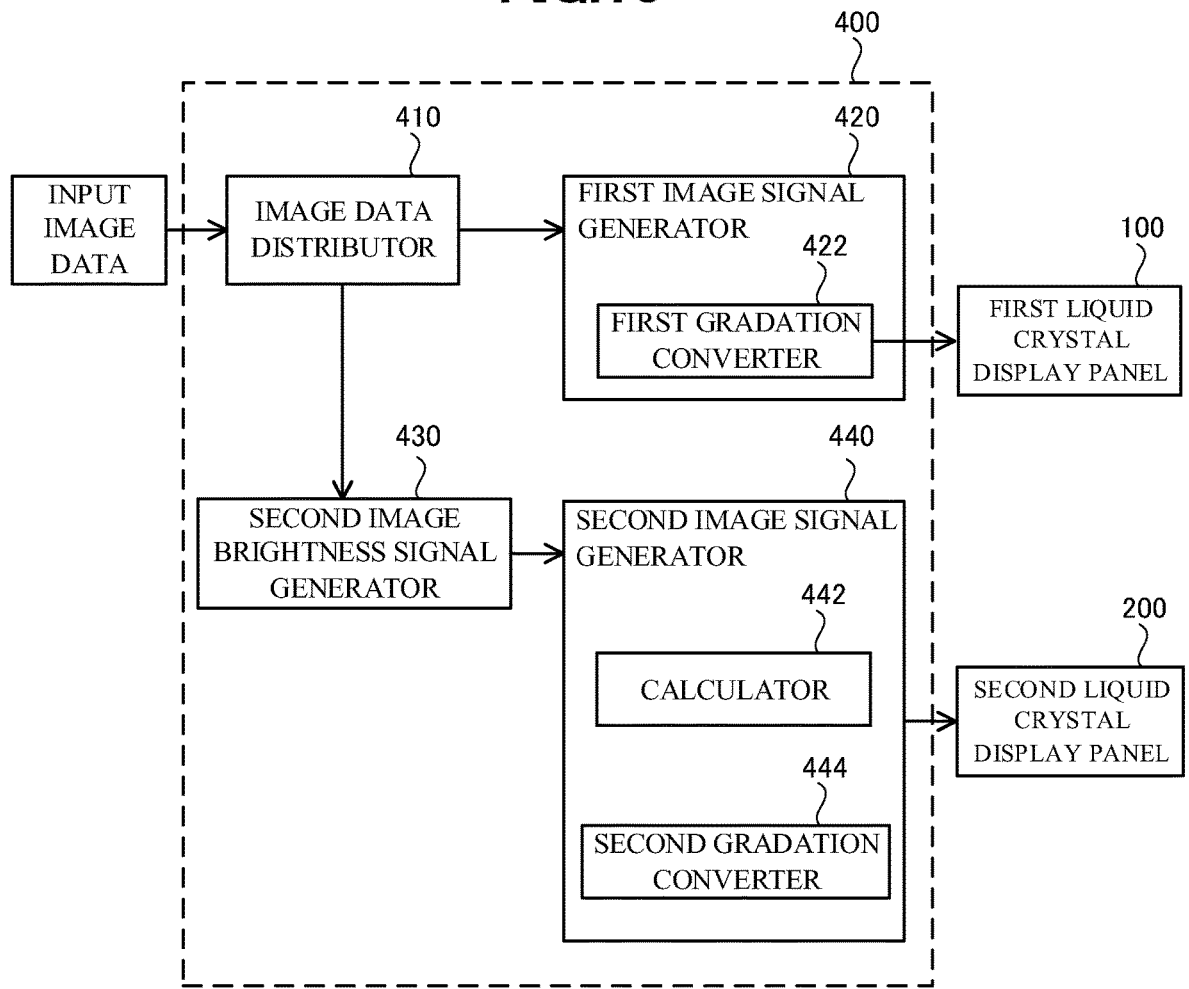
FIG. 10 is a block diagram illustrating a display controller according to Embodiment 1.

The display controller 400 controls the displays of the first liquid crystal display panel 100 and the second liquid crystal display panel 200. As illustrated in FIG. 10, the display controller 400 includes an image data distributor 410, a first image signal generator 420, a second image brightness signal generator 430, and a second image signal generator 440.

The image data distributor 410 distributes input image data to the first image signal generator 420 and the second image brightness signal generator 430.

The first image signal generator 420 generates, from the input image data distributed by the image data distributor 410, a color image to be displayed on the first liquid crystal display panel 100. Specifically, the first gradation converter 422 of the first image signal generator 420 performs gradation conversion for converting the distributed input image data to color image data having brightness-gradation characteristics suited to the first liquid crystal display panel 100. In one example, a lookup table in which input/output relationships are preset is used in the conversion of the data. The first image signal generator 420 sends a color image signal expressing the generated color image to the first driver circuit 136 of the first liquid crystal display panel 100.

The second image brightness signal generator 430 generates, from the input image data distributed from the image data distributor 410, a brightness signal for generating a monochrome image to be displayed on the second liquid crystal display panel 200. In one example, the second image brightness signal generator 430 calculates the brightness level of one main pixel 202 of the second liquid crystal display panel 200 from an average value, a frequency value, a minimum value, a maximum value, and the like of a red gradation value, a green gradation value, and a blue gradation value of the 16 main pixels 102 of the first liquid crystal display panel 100 into which the light emitted from one main pixel 202 of the second liquid crystal display panel 200 enters. The calculated brightness level may be a gradation value. The second image brightness signal generator 430 sends a brightness signal expressing the calculated brightness level to the second image signal generator 440.

The second image signal generator 440 generates, on the basis of the brightness signal sent from the second image brightness signal generator 430, the monochrome image to be displayed on the second liquid crystal display panel 200. In one example, the second image signal generator 440 generates a monochrome image that has been subjected to averaging processing and gradation conversion. Specifically, in one example, the calculator 442 of the second image signal generator 440 uses a weighted average based on the distance from a target main pixel 202 to average the brightness levels of the main pixels 202 located within a predetermined distance from the target main pixel 202. As a result, the second image signal generator 440 can generate a monochrome image that has blurred edges. Furthermore, the second gradation converter 444 of the second image signal generator 440 generates monochrome image data having brightness-gradation characteristics suited to the second liquid crystal display panel 200. The configuration of the second gradation converter 444 is the same as that of the first gradation converter 422 of the first image signal generator 420.

The monochrome image signal sent to the second liquid crystal display panel 200 is delayed, by the calculation of the brightness level, the averaging processing, and the like executed by the second image brightness signal generator 430, with respect to the color image signal sent to the first liquid crystal display panel 100. As such, the display controller 400 includes a non-illustrated synchronization circuit for synchronizing the outputting of the monochrome image signal and the color image signal. Due to this synchronization circuit, the monochrome image corresponding to the color image of the first liquid crystal display panel 100 is displayed on the second liquid crystal display panel 200 and, as such, an appropriate color image is displayed on the liquid crystal display device 10.

The display controller 400 is configured from a central processing unit (CPU), a memory, and the like. In one example, the CPU executes programs stored in the memory to realize the functions of the display controller 400.

As described above, the first light blocking pattern (the scan wirings GL) of the second liquid crystal display panel 200 is formed from the first light blocking line 262 including the first incline 262a inclined with respect to the +X direction, the second incline 262b inclined in the direction opposite the first incline 262a with respect to the +X direction, and the first flat section 262c that connects the first incline 262a and the second incline 262b to each other, and the second light blocking line 264 that is line-symmetrical, with respect to the X direction, to the first light blocking line 262. As a result, spatial frequency interference between the first liquid crystal display panel 100 and the second liquid crystal display panel 200 is suppressed and, as such, the moiré of the liquid crystal display device 10 can be suppressed. Furthermore, the occurrence of color moiré can be suppressed.

Additionally, the second light blocking pattern (the signal wirings DL) of the second liquid crystal display panel 200 is formed from the third light blocking line 272 including the fifth incline 272a inclined with respect to the +Y direction and the sixth incline 272b inclined in the direction opposite the fifth incline 272a with respect to the +Y direction, and the fourth light blocking line 274 that is line-symmetrical, with respect to the Y direction, to the third light blocking line 272. As a result, spatial frequency interference between the first liquid crystal display panel 100 and the second liquid crystal display panel 200 is suppressed and, as such, the moiré of the liquid crystal display device 10 can be suppressed. Furthermore, the occurrence of color moiré can be suppressed.

Modified Examples

Embodiments have been described, but various modifications can be made to the present disclosure without departing from the spirit and scope of the present disclosure.

In the embodiments, the first liquid crystal display panel 100 and the second liquid crystal display panel 200 operate by the horizontal electric field type method. However, the operating method of the first liquid crystal display panel 100 and the second liquid crystal display panel 200 may be determined as desired.

In the embodiments, the first polarizing plate 132 of the first liquid crystal display panel 100 also serves as the polarizing plate on the light emission side of the second liquid crystal display panel 200. However, a configuration is possible in which the second liquid crystal display panel 200 includes a polarization plate on the main surface 220b of the second counter substrate 220.

In the embodiments, the switching elements 240 of the second liquid crystal display panel 200 are formed along the scan wirings GL (the first light blocking line 262 and the second light blocking line 264), and are inclined with respect to the X direction. However, a configuration is possible in which the switching elements 240 are formed along the X direction. Such a configuration makes it possible to suppress the moiré to a greater degree.

In the embodiments, one main pixel 202 of the second liquid crystal display panel 200 corresponds to 16 main pixels 102 of the first liquid crystal display panel 100. However, the number of main pixels 102 of the first liquid crystal display panel 100 that correspond to one main pixel 202 of the second liquid crystal display panel 200 may be set as desired.

For example, a configuration is possible in which one main pixel 202 of the second liquid crystal display panel 200 corresponds to one main pixel 102 of the first liquid crystal display panel 100. In such a case, the display controller 400 calculates the brightness level of the corresponding one main pixel 202 of the second liquid crystal display panel 200 on the basis of the color image data of the one main pixel 102 of the first liquid crystal display panel 100. Additionally, as another method, the display controller 400 may calculate the brightness level of the monochrome image with the maximum gradation value among the red gradation value, the green gradation value, and the blue gradation value of each main pixel of the input image data as the brightness level of each main pixel 202 of the second liquid crystal display panel 200.

In the embodiments, the second liquid crystal display panel 200 includes the first light blocking pattern 260 and the second light blocking pattern 270. However, it is sufficient that the second liquid crystal display panel 200 includes at least one of the first light blocking pattern 260 or the second light blocking pattern 270.

Additionally, the first light blocking line 262 of the first light blocking pattern 260 includes the first flat section 262c, and the second light blocking line 264 of the first light blocking pattern 260 includes the second flat section 264c. However, a configuration is possible in which the first light blocking line 262 does not include the first flat section 262c, and the second light blocking line 264 does not include the second flat section 264c. That is, a configuration is possible in which the first light blocking line 262 and the second light blocking line 264 have a line-symmetrical relationship with respect to the X direction, and each extends in a zig-zag in the X direction.

Figure 11:
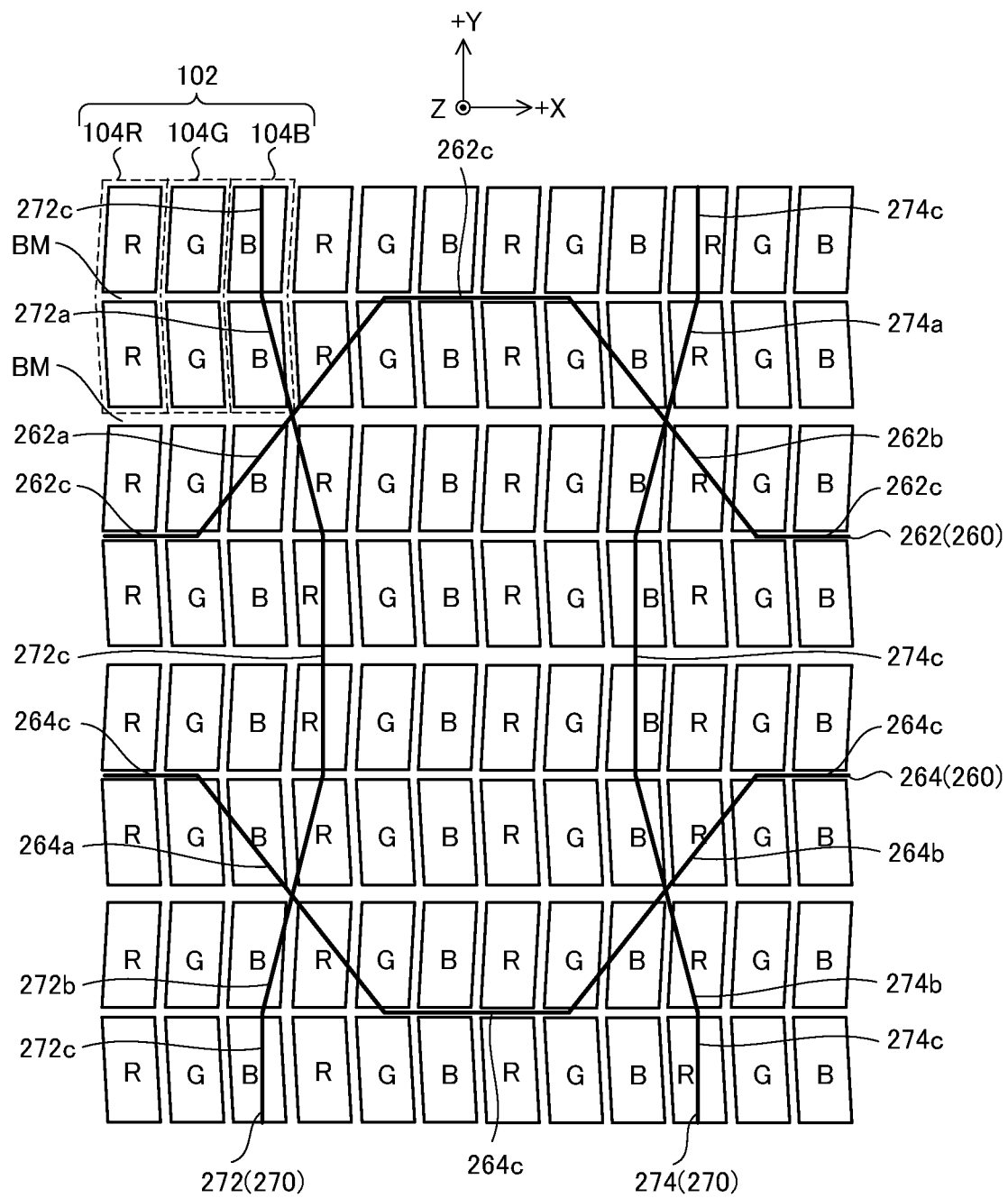
FIG. 11 is a schematic drawing illustrating a first light blocking pattern, a second light blocking pattern, and main pixels of the first liquid crystal display panel corresponding to one main pixel of a second liquid crystal display panel according to a modified example.

Meanwhile, as illustrated in FIG. 11, a configuration is possible in which the third light blocking line 272 of the second light blocking pattern 270 includes a third flat section 272c that connects the fifth incline 272a and the sixth incline 272b to each other and that extends parallel to the Y direction. Additionally, a configuration is possible in which the fourth light blocking line 274 of the second light blocking pattern 270 includes a fourth flat section 274c that connects the seventh incline 274a and the eighth incline 274b to each other and that extends parallel to the Y direction.

Figure 12:
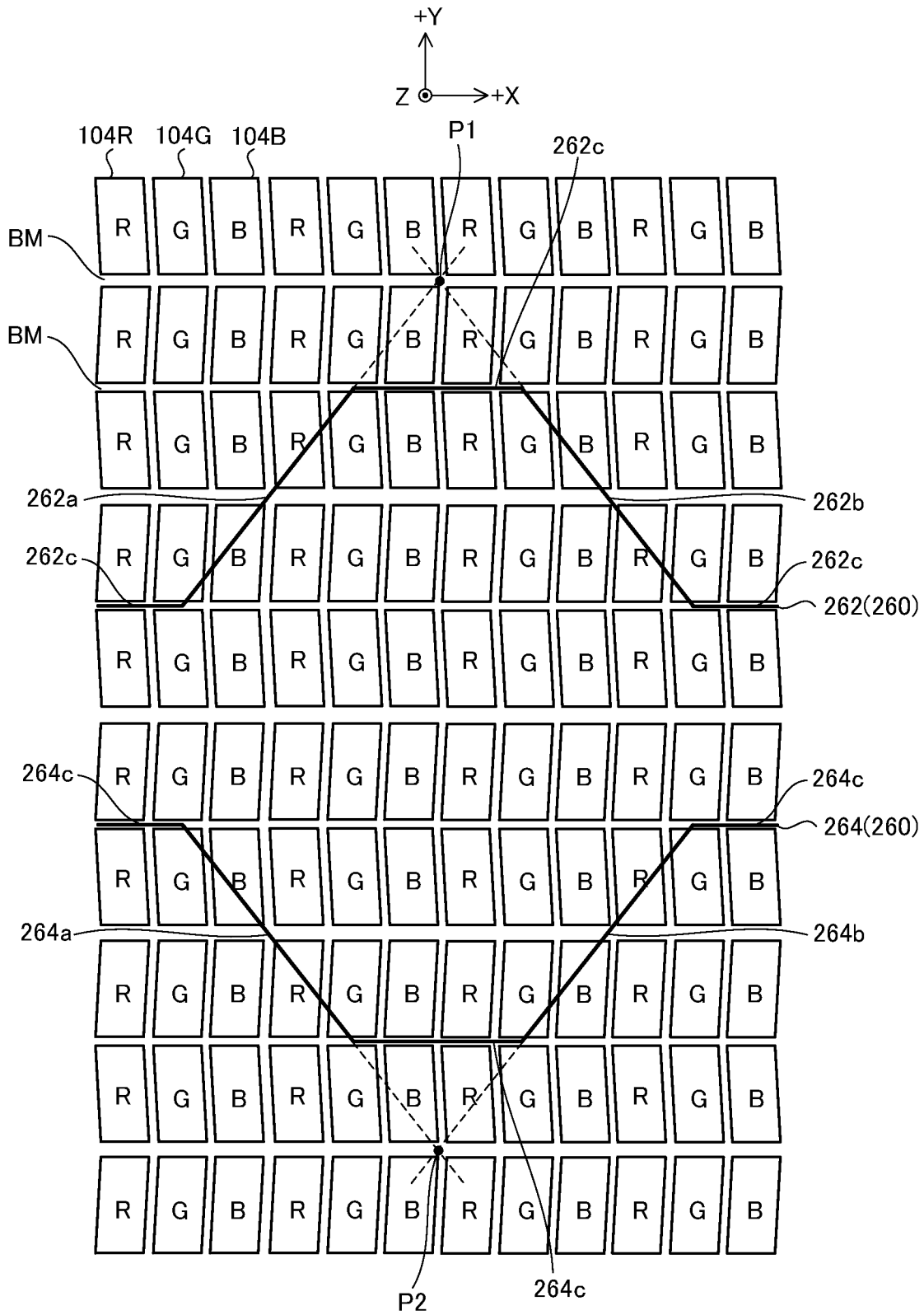
FIG. 12 is a schematic drawing illustrating intersections of a first incline and a second incline in a first light blocking line according to a modified example.

It is preferable that the flat sections that connect the inclines of the light blocking lines to each other are provided on the light blocking lines that extend in a direction perpendicular to the stripe direction of the color filter 122 of the first liquid crystal display panel 100. For example, when, as in the embodiments, the color filter 122 of the first liquid crystal display panel 100 is a color filter in which color filters of the same color are arranged in the Y direction, it is preferable that the flat sections (the first flat section 262c and the second flat section 264c) are provided on the first light blocking line 262 and the second light blocking line 264 that extend in the X direction. As a result, as illustrated in FIG. 12, an intersection P1 of the first incline 262a and the second incline 262b and an intersection P2 of the third incline 264a and the fourth incline 264b are positioned between the sub pixels 104 of specific colors (104R and 104B) of the first liquid crystal display panel 100 and, as such, situations in which the first light blocking line 262 and the second light blocking line 264 block a large amount of light entering the sub pixels 104 of the specific colors can be prevented. When the first light blocking line 262 and the second light blocking line 264 block a large amount of light entering the sub pixels 104 of specific colors, color shifts may occur in the display of the liquid crystal display device 10. Note that, to facilitate comprehension, the second light blocking pattern 270 is omitted from FIG. 12.

A configuration is possible in which the stripe direction of the color filter 122 of the first liquid crystal display panel 100 is the X direction. In such a case, it is preferable that the third light blocking line 272 and the fourth light blocking line 274 that extend in the Y direction include flat sections (the third flat section 272c and the fourth flat section 274c).

Figure 13:
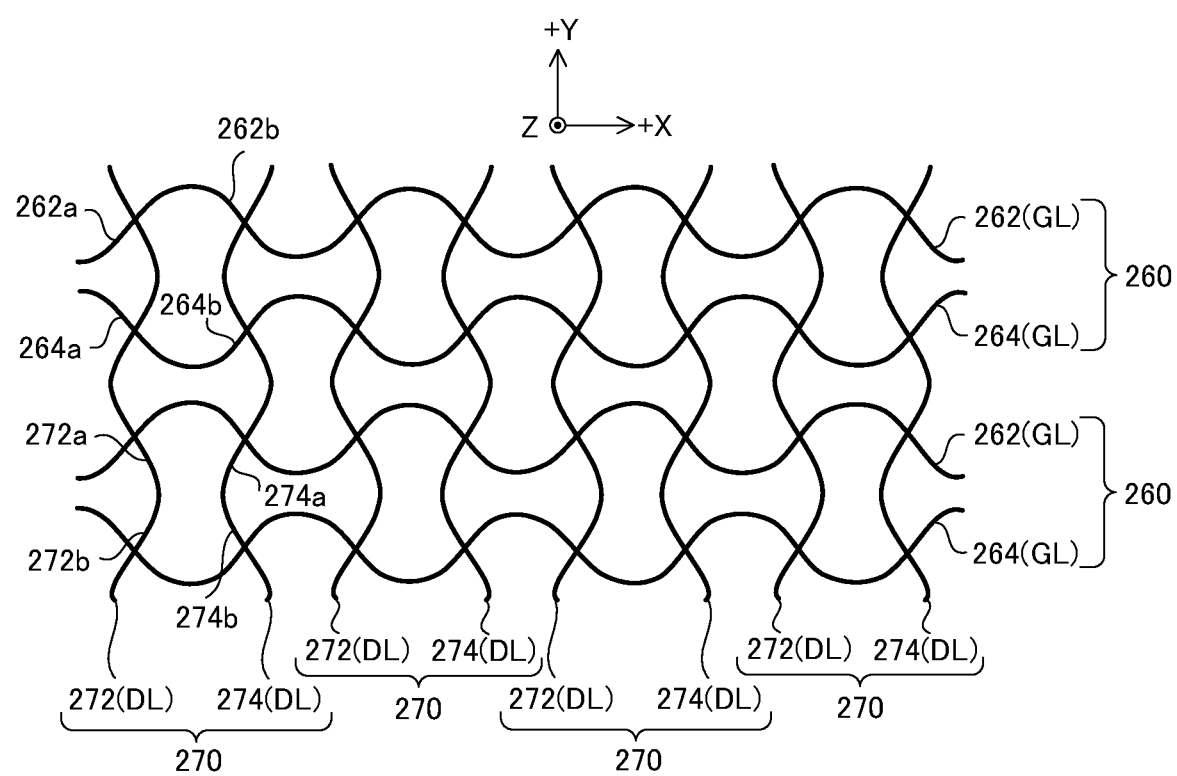
FIG. 13 is a schematic drawing illustrating a first light blocking pattern and a second light blocking pattern according to a modified example.

A configuration is possible in which the first light blocking line 262 and the second light blocking line 264 of the first light blocking pattern 260 and the third light blocking line 272 and the fourth light blocking line 274 of the second light blocking pattern 270 are curved lines as illustrated in FIG. 13.

In the embodiments, the scan wirings GL form the first light blocking line 262 and the second light blocking line 264 of the first light blocking pattern 260. It is sufficient that at least one of the first light blocking line 262 or the second light blocking line 264 of the first light blocking pattern 260 is formed from a scan wiring GL. For example, a configuration is possible in which, when the first light blocking line 262 is formed from a scan wiring GL, the second light blocking line 264 is a low-resistance wiring that connects the common electrodes CE. A configuration is possible in which the second light blocking line 264 is a light blocking body (light blocking pattern) formed from an organic material having light blocking properties. Additionally, in the second light blocking pattern 270 as well, it is sufficient that at least one of the third light blocking line 272 or the fourth light blocking line 274 is formed from a signal wiring DL.

Furthermore, a configuration is possible in which the first light blocking pattern 260 and the second light blocking pattern 270 are provided on the first liquid crystal display panel 100. It is sufficient that the first light blocking pattern 260 and the second light blocking pattern 270 are provided on at least one of the first liquid crystal display panel 100 or the second liquid crystal display panel 200.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal display device, comprising:
a first liquid crystal display panel; and
a second liquid crystal display panel that is positioned on a side, opposite a surface of an observer side, of the first liquid crystal display panel so as to overlap the first liquid crystal display panel, wherein
at least one of the first liquid crystal display panel and the second liquid crystal display panel includes a light-blocking pattern that is repeatedly arranged and has light blocking properties,
in a plan view from the observer side, the light blocking pattern includes a first light blocking line that extends in a predetermined direction, the first light blocking line including a first incline inclined with respect to the predetermined direction and a second incline inclined in a direction opposite the first incline with respect to the predetermined direction, and a second light blocking line that is adjacent to the first light blocking line and that is line-symmetrical, with respect to the predetermined direction, to the first light blocking line, and at least one of the first light blocking line and the second light blocking line is formed from one of a scan wiring and a signal wiring of the first liquid crystal display panel and the second liquid crystal display panel.

2. The liquid crystal display device according to claim 1, wherein the first incline and the second incline of the first light blocking line of one of the first liquid crystal display panel and the second liquid crystal display panel are inclined across a plurality of pixels of another of the first liquid crystal display panel and the second liquid crystal display panel.

3. The liquid crystal display device according to claim 1, wherein the first light blocking line includes a flat section that connects the first incline and the second incline to each other and that extends parallel to the predetermined direction.

4. The liquid crystal display device according to claim 3, wherein a stripe direction of a color filter provided on one of the first liquid crystal display panel and the second liquid crystal display panel is perpendicular to a direction in which the flat section, of the first light blocking line of the light blocking pattern provided on the other of the first liquid crystal display panel and the second liquid crystal display panel, extends.

5. The liquid crystal display device according to claim 1, wherein the first light blocking line is a curved line.

* * * * *